United States Patent [19]
Mowry

[11] Patent Number: 5,375,742
[45] Date of Patent: Dec. 27, 1994

[54] GAS-OIL MIXTURE AID

[76] Inventor: Ivan H. Mowry, 2092 Mars Ave., Lakewood, Ohio 44107

[21] Appl. No.: 115,112

[22] Filed: Sep. 2, 1993

[51] Int. Cl.⁵ .............................................. B67D 5/04
[52] U.S. Cl. ...................................... 222/131; 222/158
[58] Field of Search ............... 220/23.4, 86.1; 73/426, 73/427; 222/131, 157, 158, 566

[56] References Cited

U.S. PATENT DOCUMENTS

| | | | |
|---|---|---|---|
| 1,762,331 | 6/1930 | Greist | 220/23.4 X |
| 1,948,932 | 2/1934 | McMickle | 73/427 |
| 3,924,472 | 12/1975 | Harris | 73/426 |
| 3,948,105 | 4/1976 | Johnson, Jr. | 73/427 |
| 4,079,629 | 3/1978 | Hope | 73/427 |
| 4,109,530 | 8/1978 | Kim | 73/427 |
| 4,135,404 | 1/1979 | Butler | 222/158 X |
| 4,292,846 | 10/1981 | Barnett | 220/694 X |
| 4,294,372 | 10/1981 | Onishi | 220/86.1 X |
| 4,445,370 | 5/1984 | Whitmire | 73/428 X |
| 4,480,470 | 11/1984 | Tussing | 222/158 X |
| 4,721,393 | 1/1988 | Kwast | 73/426 |
| 4,767,027 | 8/1988 | Lewinter et al. | 222/158 |
| 4,819,833 | 4/1989 | Huddleston et al. | 222/158 X |
| 5,108,016 | 4/1992 | Waring | 222/158 X |
| 5,123,460 | 6/1992 | Reed | 220/23.4 X |

FOREIGN PATENT DOCUMENTS 865810  2/1953  Germany .......................... 222/158

Primary Examiner—Andres Kashnikow
Assistant Examiner—Kenneth Bomberg
Attorney, Agent, or Firm—Hugh E. Smith

[57] ABSTRACT

A gas-oil mixture aid which comprises: a first transparent main cylinder having indicia lines marked or engraved thereon at a plurality of levels from the base; a second, smaller transparent cylinder having similar lines engraved or marked upon it, said lines on said smaller cylinder corresponding with the lines on the larger cylinder; said second cylinder adapted to clip to the side of said first main cylinder to permit said sets of lines to register one with the other; said second cylinder being selected from a group of three similar length but varying diameter cylinders, each of said cylinders adapted to hold oil to be mixed with gasoline in said main cylinder in one of three standard gas to oil ratios commonly in usage. Means are also provided to encase said main cylinder in a rigid protection carrying and dispensing means which may be provided with an agitator to insure proper mixing.

9 Claims, 4 Drawing Sheets

GAS-OIL MIXTURE AID

BACKGROUND OF THE INVENTION

1. Field of the Invention

The present invention relates to mixing devices and more particularly pertains to such devices which may be utilized to properly proportion and mix oil with gasoline in any of the three most common ratios.

2. Description of the Prior Art

The use of proportioning and mixing devices is known in the prior art. More specifically, such devices heretofore devised and utilized for the purpose of mixing oil and gas in desired ratios are known to consist basically of complex, familiar, expected and obvious structural configurations, notwithstanding the myriad of designs encompassed by the crowded prior art which have been developed for the fulfillment of countless objectives and requirements. Typical of such units are those shown in U.S. Pat. Nos. 4,445,370; 4,079,629; 4,721,393; 4,819,833; and 5,108,016. These devices generally are confusing to the average user and a simpler devices for this purpose would be desirable.

In this respect, the gas-oil mixture aid according to the present invention substantially departs from the conventional concepts and designs of the prior art, and in so doing provides an apparatus primarily developed for the purpose of simplifying the admixture of oil and gas in any of three commonly used ratios.

Therefore, it can be appreciated that there exists a continuing need for new and improved proportioning and mixing devices which can be used without difficulty. In this regard, the present invention substantially fulfills this need.

SUMMARY OF THE INVENTION

In view of the foregoing disadvantages inherent in the known types of proportioning and mixing devices now present in the prior art, the present invention provides an improved proportioning and mixing construction wherein the same can be utilized by the average person without confusion. As such, the general purpose of the present invention, which will be described subsequently in greater detail, is to provide a new and improved gas-oil mixture aid which has all the advantages of the prior art devices and none of the disadvantages.

To attain this, the present invention essentially relates to a gas-oil mixture aid which comprises: a first transparent main cylinder having indicia lines marked or engraved thereon at a plurality of levels from the base; a second, smaller transparent cylinder having similar lines engraved or marked upon it, said lines on said smaller cylinder corresponding with the lines on the larger cylinder; said second cylinder adapted to clip to the side of said first main cylinder to permit said sets of lines to register one with the other; said second cylinder being selected from a group of three similar length but varying diameter cylinders, each of said cylinders adapted to hold oil to be mixed with gasoline in said main cylinder in one of three standard gas to oil ratios commonly in usage. Means are also provided to encase said main cylinder in a rigid protection carrying and dispensing means which may be provided with an agitator to insure proper mixing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gas-oil mixture aid which has all the advantages of the prior art devices and none of the disadvantages.

It is another object of the present invention to provide a new and improved gas-oil mixture aid which may be easily and efficiently manufactured and marketed.

It is a further object of the present invention to provide a new and improved gas-oil mixture aid which is of a durable and reliable construction.

An even further object of the present invention is to provide a new and improved gas-oil mixture aid which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved gas-oil mixture aid which provides in the apparatuses and methods of the prior art some of the advantages thereof, while simultaneously overcoming some of the disadvantages normally associated therewith.

Still another object of the present invention is to provide a new and improved gas-oil mixture aid which is not confusing to use.

Yet another object of the present invention is to provide a new and improved gas-oil mixture aid which essentially eliminates errors in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
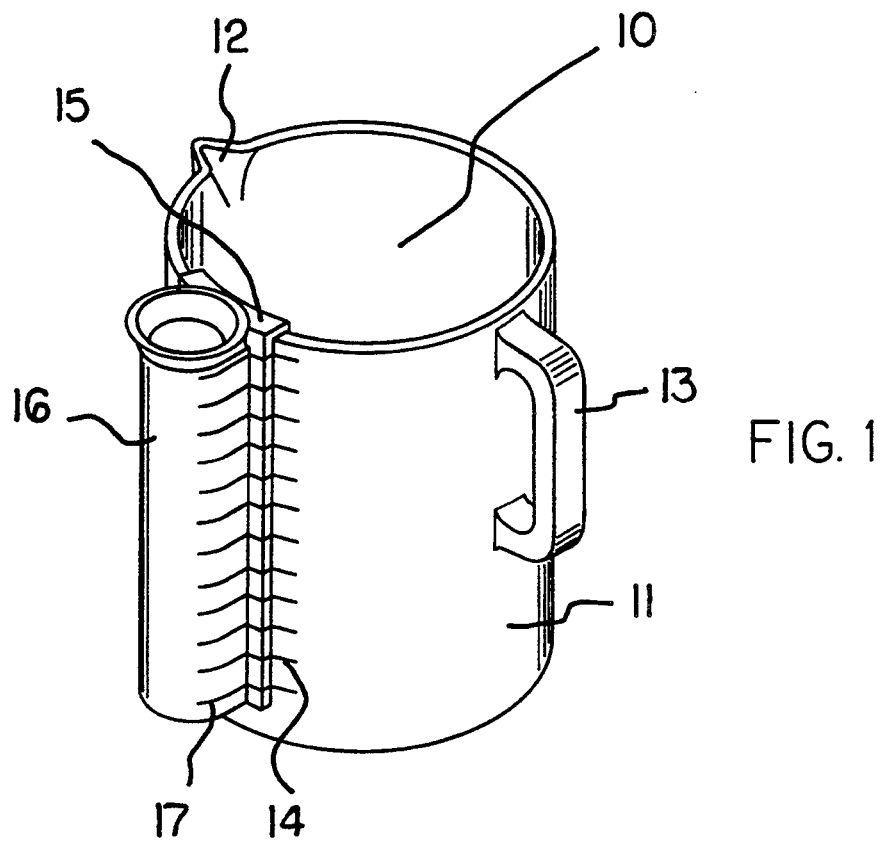
FIG. 1 is a perspective view of the present invention.

With reference now to the drawings, and in particular to FIG. 1 thereof, a new and improved gas-oil mixture aid embodying the principles and concepts of the present invention and generally designated by the reference numeral 10 will be described.

Figure 2:
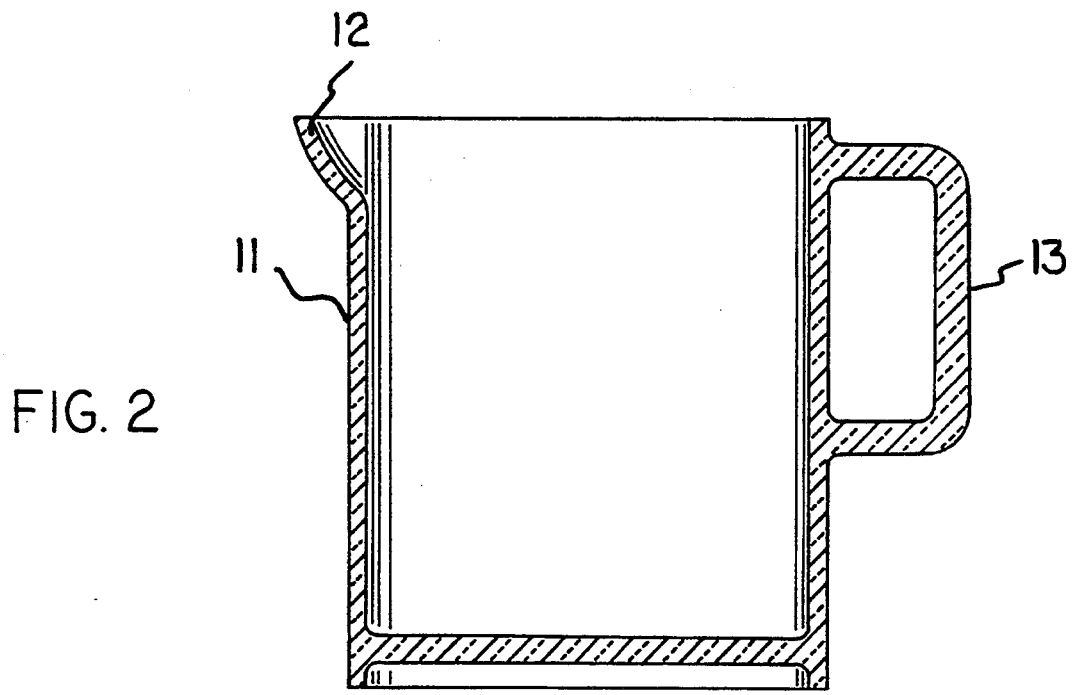
FIG. 2 is a sectional side view of the container shown in FIG. 1.
Figure 3:
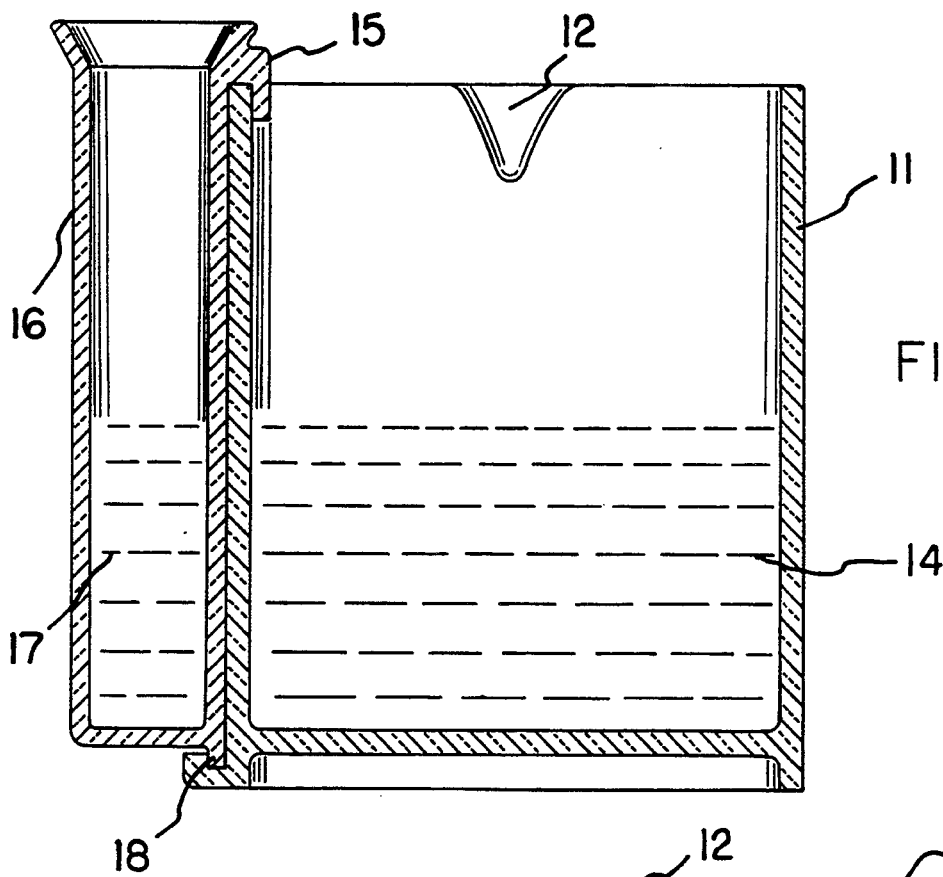
FIG. 3 is a sectional side view of the structure in FIG. 1.

A main container 11 for gasoline is one component of the system 10. Such main container 11 is transparent so that the liquid level therein can be readily seen and may be formed of glass or preferably a hydrocarbon resistant plastic. Preferably such main container 11 has a pour lip 12 and a lifting handle 13. Inscribed on the side of container 11 are a plurality of lines 14 parallel with the base of container 11 and spaced upwardly therefrom. Mounted by means of a clip 15 to the side wall of container 11 is a small diameter cylinder 16, said small diameter cylinder 16 also having a plurality of lines 17 inscribed thereon. When suspended on container 11, lines 17 will coincide or overlie lines 14 on container 11 as shown in FIG. 3. FIG. 2 clearly shows the main container 11. As shown in FIG. 3, preferably the smaller diameter cylinder 16 is secured to the wall of cylinder 11 by a retaining member 18 at the base thereof which projects into an unlabeled retaining member receiver extending from a lower portion of the side wall of the cylinder 11, as well as by clip 15 to insure alignment of the two sets of lines 14 and 17.

Figure 4:
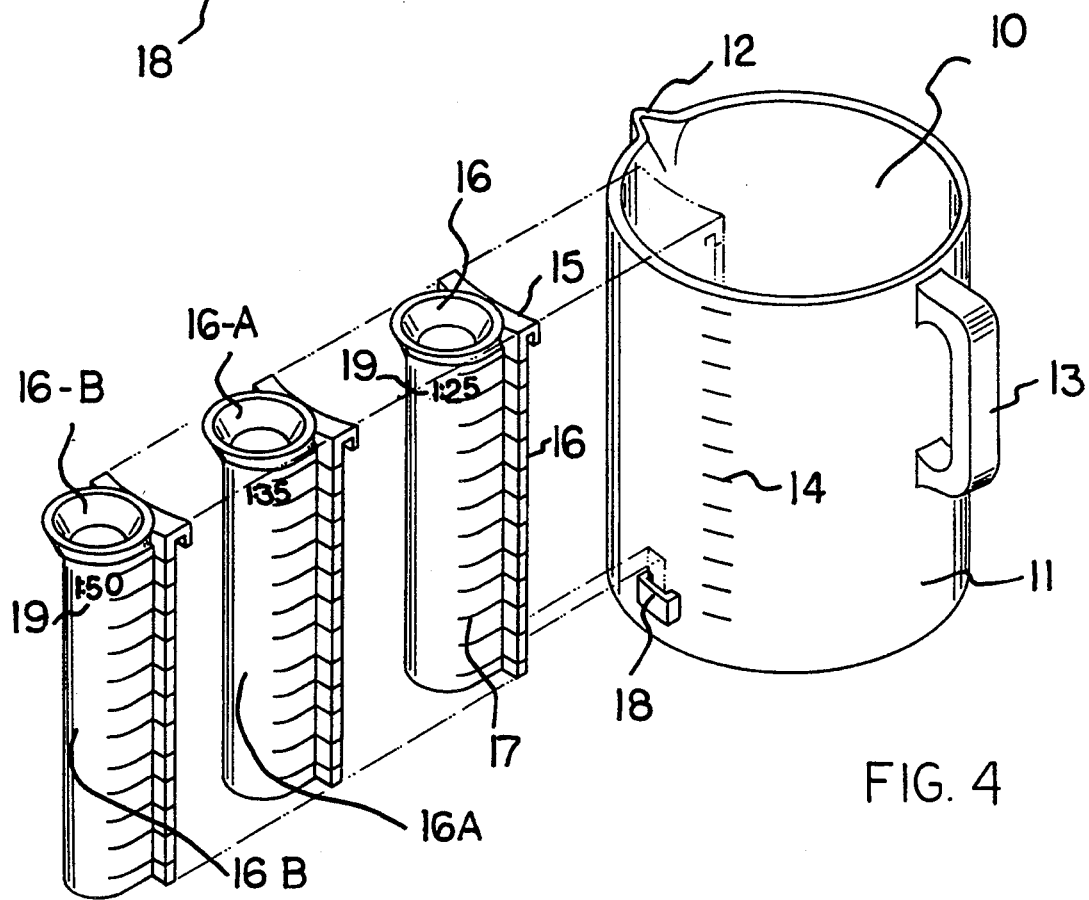
FIG. 4 is a perspective view of the present invention showing the multiple-ratio tubes.
Figure 5:
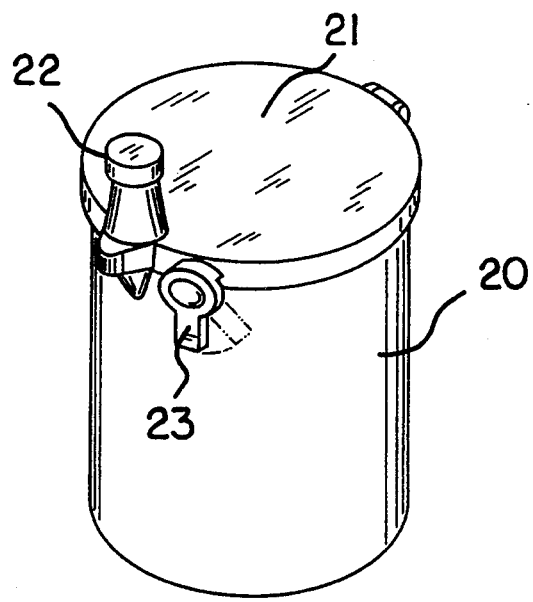
FIG. 5 is a perspective view of a protective holder for the device of FIG. 1.
Figure 6:
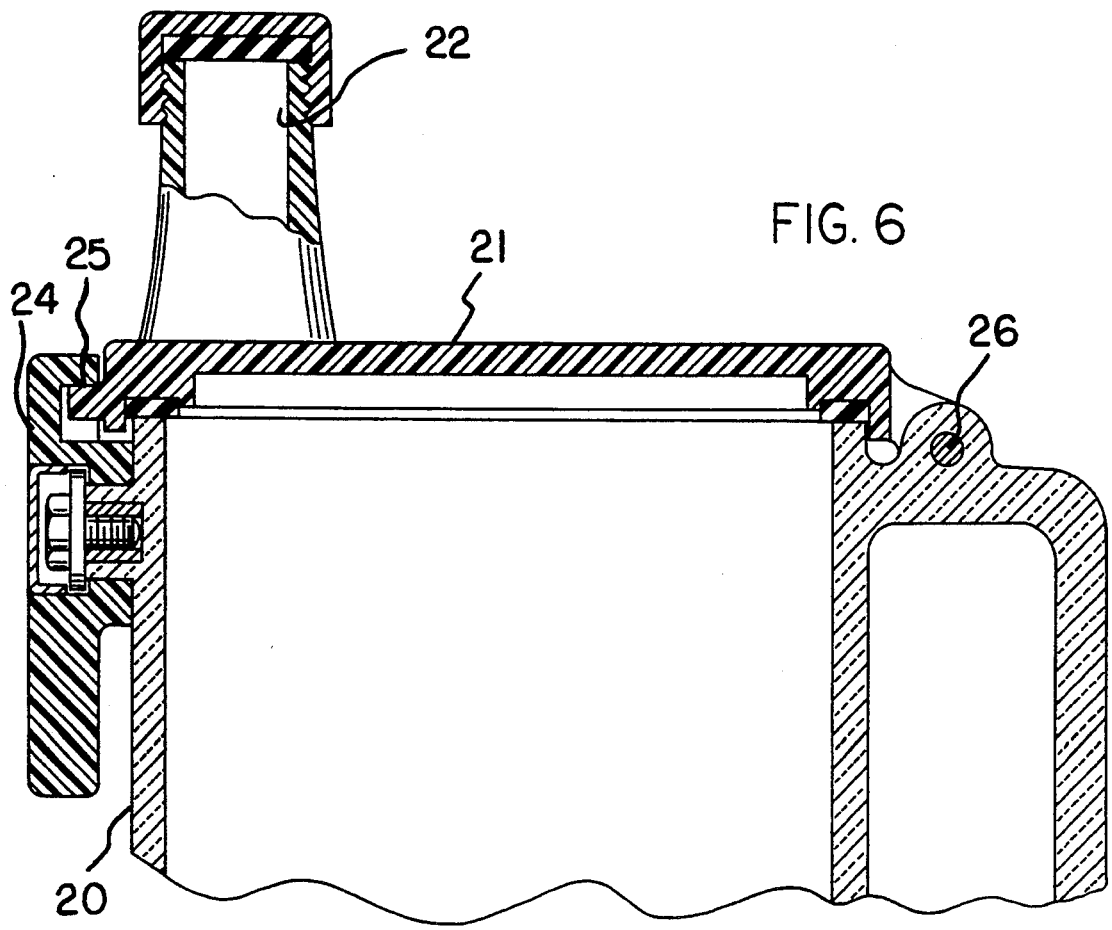
FIG. 6 is a sectional view of the top portion of such holder.

FIG. 4 illustrates that the device 10 of the present invention presents an option to use one of three small cylinders 16, 16-A and 16-B. Each of said small cylinders is of the same length and the lines 17 thereon are at the same spacing above the base thereof. However, the diameter of each such small cylinder 17 will vary slightly. The reason for this is that gas-oil mixtures for normal two-cycle engines will usually be in one of three ratios b 1:25, 1:35, or 1:50. By varying the diameter, the amount of oil contained at any given line 17 on cylinder 16, 16-A or 16-B will correspond to the amount required by the volume of gasoline at the coinciding mark or line 14 on main cylinder 11. The cylinders 16, 16-A and 16-B will carry identifying legends for such ratios thereon as at 19.

As shown in FIGS. 5 through 8, a protective carrying cylinder 20 may be provided for transport of main cylinder 11 and/or its contents. Such cylinder 20 of suitable diameter to accept cylinder 11 therein is formed of a rigid material such as plastic or metal and is provided with a closeable top 21 and pour spout 22. Latching means 23 serve to keep the cover 21 closed. As shown in detail in FIG. 6, such latching means preferably has a pivoted rotating cam latch 24 engaging with a lug 25 on cover 21. Preferably cover 21 is pivotally connected to cylinder 20 as by hinge 26.

Figure 7:
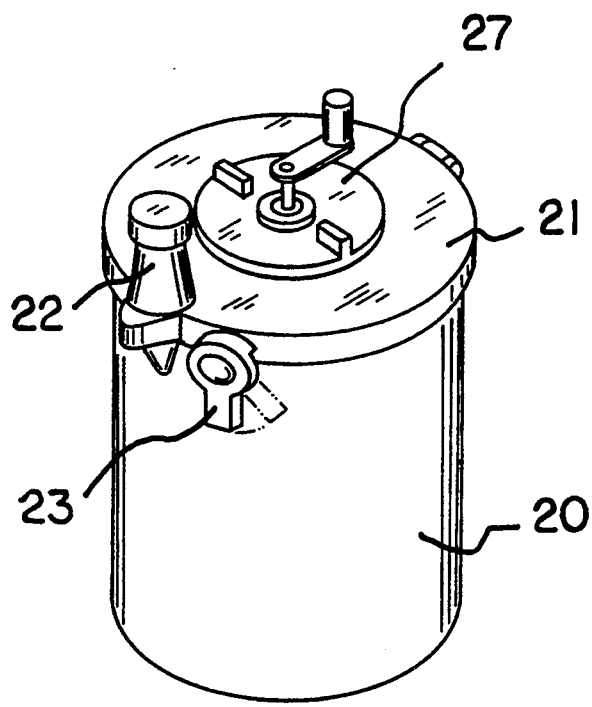
FIG. 7 is a perspective view of a holder as in FIG. 5 provided with agitating or mixing capabilities.
Figure 8:
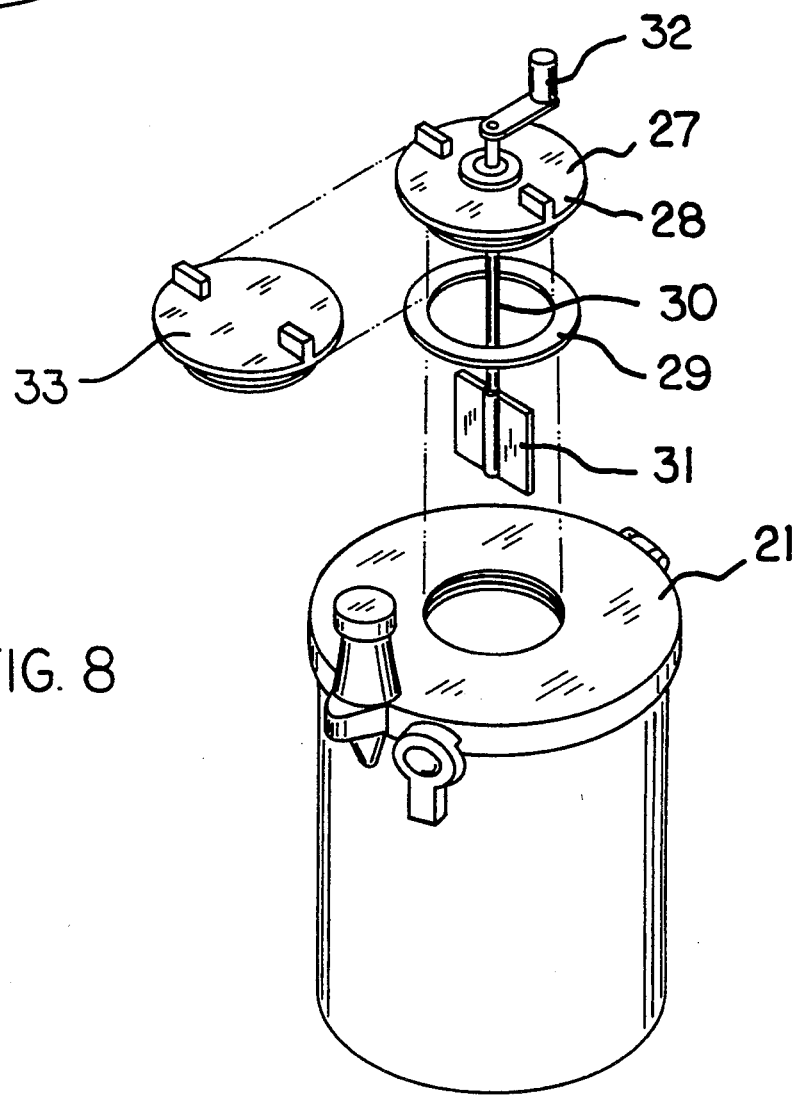
FIG. 8 is an exploded perspective view of the structure shown in FIG. 7.

As shown in FIG. 7 and 8, agitating or mixing means 27 may be added to container 20 to insure thorough mixing of the gas and oil. As most clearly shown in FIG. 8, such mixing means 27 consists of a screw cap 28 adapted to thread into cover 21, a gasket 29 and depending through cap 28 a shaft 30 having at the lower end thereof a rotatable paddle 31. The upper end of shaft 30 is provided with a crank handle 32 to rotate such paddle 31. If desired, the cap 28 and associated hardware can be replaced with a solid cap 33 for definite leak-proof transport.

In using the present invention, one merely selects the small cylinder marked with the desired oil-gas ratio, clips such cylinder to the main cylinder and pours oil into the small cylinder to the same level as the gas in the main cylinder. The small cylinder is then unclipped and dumped into the main cylinder giving the desired ratio of oil to gas. For transport, the main cylinder can be placed into its protective outer cylinder or the mixture of gas and oil therein dumped into such outer cylinder or a similar carrying can.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A gas-oil mixture aid comprising:
   a first main cylinder for receiving a first fluid, said first main cylinder having a first main cylinder bottom wall, and a first main cylinder side wall with a first main cylinder upper periphery being defined by an uppermost portion of said first main cylinder side wall, said first main cylinder further having a retaining member receiver extending from a lower portion of said first main cylinder side wall;

a second cylinder for receiving a second fluid, said second cylinder having a second cylinder bottom wall, and a second cylinder side wall with a second cylinder upper periphery being defined by an uppermost portion of said second cylinder side wall, said second cylinder further having a clip projecting from said second cylinder side wall, said clip being removably engaged to said first main cylinder side wall and extending over said first main cylinder upper periphery with a retaining member extending from said second cylinder into said retaining member receiver such that said second cylinder extends along and is secured to an exterior of said first main cylinder side wall; and, a plurality of visible indicia lines on each of said cylinders, said lines being spaced upwardly from a base of each of said cylinders and extending parallel to said bases thereof, said indicia lines on said second cylinder coinciding with and overlying said indicia lines on said first main cylinder when said cylinders are in juxtaposition with each other.

2. The gas-oil mixture aid as recited in claim 1, wherein said second cylinder is selected from a trio of cylinders, with each of said trio of cylinders being of a substantially identical length dimensions and of substantially disparate volume dimensions.

3. The gas-oil mixture aid as recited in claim 2, and further comprising identifying legends marked on an exterior of said trio of cylinders, said identifying legends indicating a fluid ratio obtained by adding said second fluid to said first fluid when said cylinders are filled to substantially equal levels.

4. The gas-oil mixture aid as recited in claim 3, wherein said first main cylinder includes a pour lip formed along said first main cylinder upper periphery of said first main cylinder side wall, and a handle attached to said first main cylinder side wall.

5. A gas-oil mixture aid comprising:

a first main cylinder for receiving a first fluid, said first main cylinder having a first main cylinder bottom wall, and a first main cylinder side wall with a first main cylinder upper periphery being defined by an uppermost portion of said first main cylinder side wall, said first main cylinder further having a retaining member receiver extending from a lower portion of said first main cylinder side wall;

a second cylinder for receiving a second fluid, said second cylinder having a second cylinder bottom wall, and a second cylinder side wall with a second cylinder upper periphery being defined by an uppermost portion of said second cylinder side wall, said second cylinder further having a clip projecting from said second cylinder side wall, said clip being removably engaged to said first main cylinder side wall and extending over said first main cylinder upper periphery with a retaining member extending from said second cylinder into said retaining member receiver such that said second cylinder extends along and is secured to an exterior of said first main cylinder side wall;

a plurality of visible indicia lines on each of said cylinders, said lines being spaced upwardly from a base of each of said cylinders and extending parallel to said bases thereof, said indicia lines on said second cylinder coinciding with and overlying said indicia lines on said first main cylinder when said cylinders are in juxtaposition with each other; and, a protective carrying cylinder for receiving said first main cylinder therewithin, said protective carrying cylinder including a closeable top pivotally mounted thereto, and latch means for releasably securing said closeable top to said protective carrying cylinder in a closed position.

6. The gas-oil mixture aid as recited in claim 5, wherein said closeable top includes an extending lug and said latch means comprises a cam latch rotatably mounted to an exterior of said protective carrying cylinder, said cam latch being rotatably engagable to said lug to secure said closeable top in said closed position.

7. The gas-oil mixture aid as recited in claim 6, and further comprising mixing means removably mounted to said closeable top of said protective carrying cylinder for agitating fluids within said protective carrying cylinder.

8. A gas-oil mixture aid comprising:

a first main cylinder for receiving a first fluid, said first main cylinder having a first main cylinder bottom wall, and a first main cylinder side wall with a first main cylinder upper periphery being defined by an uppermost portion of said first main cylinder side wall, said first main cylinder further having a retaining member receiver extending from a lower portion of said first main cylinder side wall;

a second cylinder for receiving a second fluid, said second cylinder having a second cylinder bottom wall, and a second cylinder side wall with a second cylinder upper periphery being defined by an uppermost portion of said second cylinder side wall, said second cylinder further having a clip projecting from said second cylinder side wall, said clip being removably engaged to said first main cylinder side wall and extending over said first main cylinder upper periphery with a retaining member extending from said second cylinder into said retaining member receiver such that said second cylinder extends along and is secured to an exterior of said first main cylinder side wall;

a plurality of visible indicia lines on each of said cylinders, said lines being spaced upwardly from a base of each of said cylinders and extending parallel to said bases thereof, said indicia lines on said second cylinder coinciding with and overlying said indicia lines on said first main cylinder when said cylinders are in juxtaposition with each other;

a protective carrying cylinder for receiving said first main cylinder therewithin, said protective carrying cylinder including a closeable top pivotally mounted thereto, and latch means for releasably securing said closeable top to said protective carrying cylinder in a closed position, wherein said closeable top includes an extending lug and said latch means comprises a cam latch rotatably mounted to an exterior of said protective carrying cylinder, said cam latch being rotatably engagable to said lug to secure said closeable top in said closed position; and, mixing means removably mounted to said closeable top of said protective carrying cylinder for agitating fluids within said protective carrying cylinder, said mixing means comprising a screw cap threadably engaged to said closeable top, said screw cap being positioned within an aperture extending through said closeable top, a gasket interposed between said screw cap and said closeable top, a shaft rotatably mounted to said screw cap and extending therethrough, said shaft having a lower distal end with a paddle mounted to said lower distal end, said shaft further having an upper proximal end with a crank handle mounted to said upper proximal end, said crank handle being manually rotatable to effect rotation of said paddle.

9. The gas-oil mixture aid as recited in claim 8, wherein said first main cylinder includes a pour lip formed along said first main cylinder upper periphery of said first main cylinder side wall, and a handle attached to said first main cylinder side wall.

* * * * *